July 14, 1953 R. C. BARNES 2,645,474
SAFETY CONTROL FOR ENGINE GOVERNORS
Filed Oct. 13, 1947 3 Sheets-Sheet 1
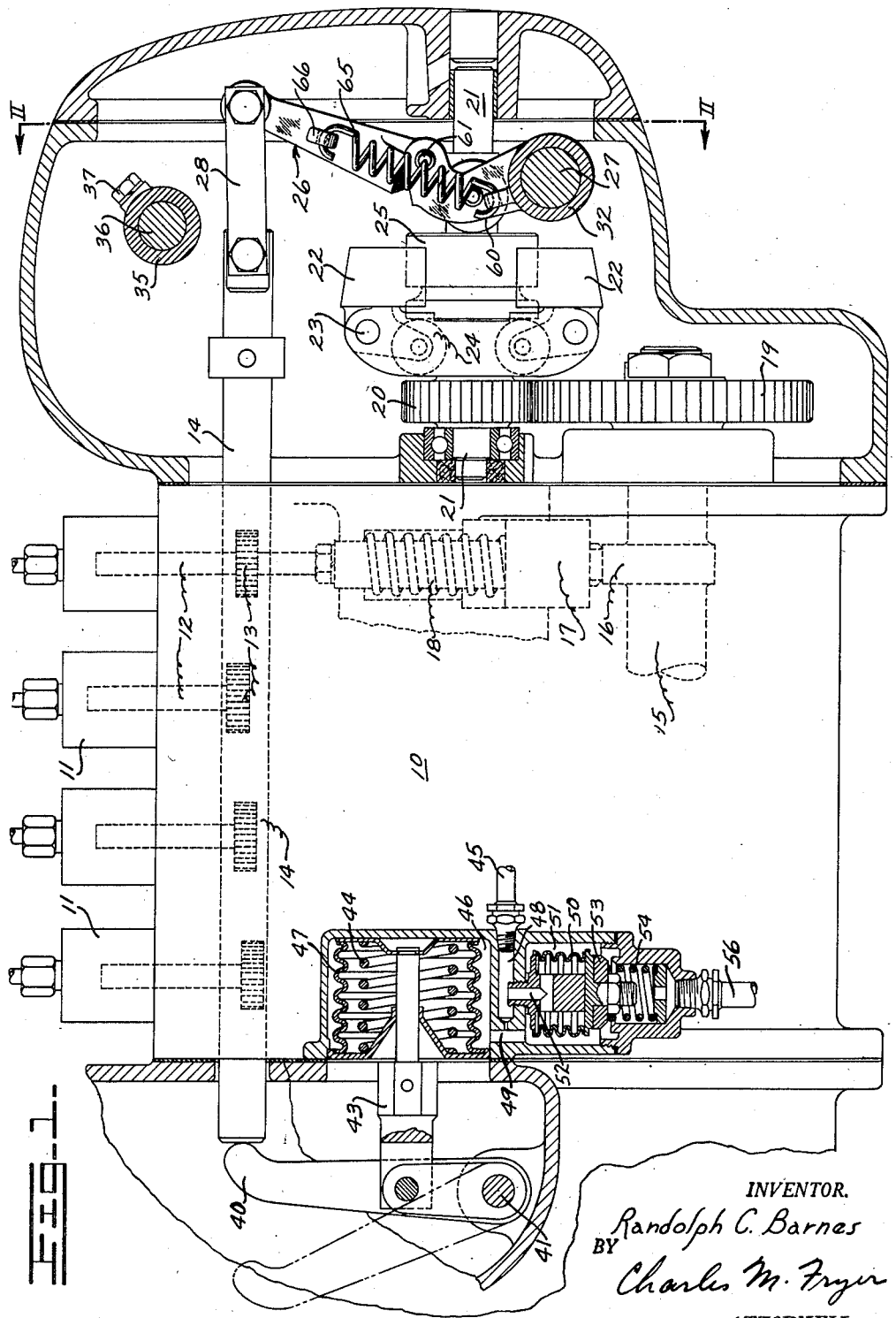
INVENTOR.
Randolph C. Barnes
BY Charles M. Fryer
ATTORNEY.

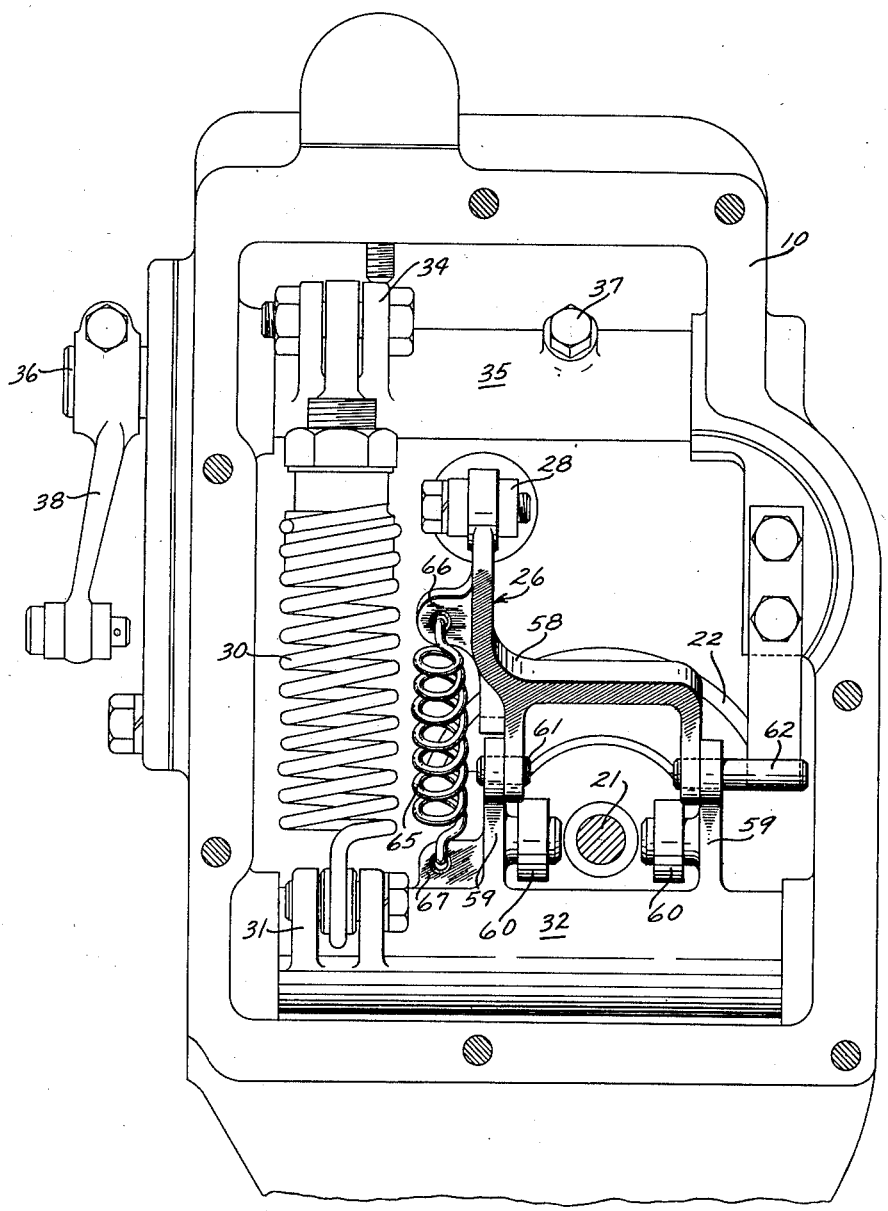

July 14, 1953     R. C. BARNES     2,645,474
SAFETY CONTROL FOR ENGINE GOVERNORS
Filed Oct. 13, 1947     3 Sheets-Sheet 3
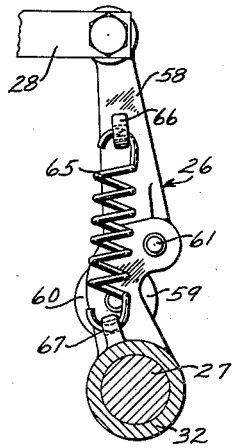
Fig-4-
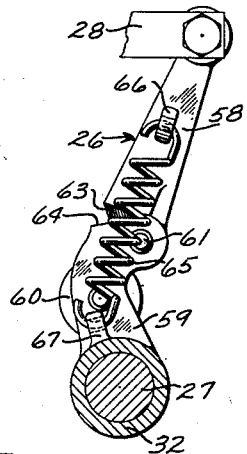
Fig-5-
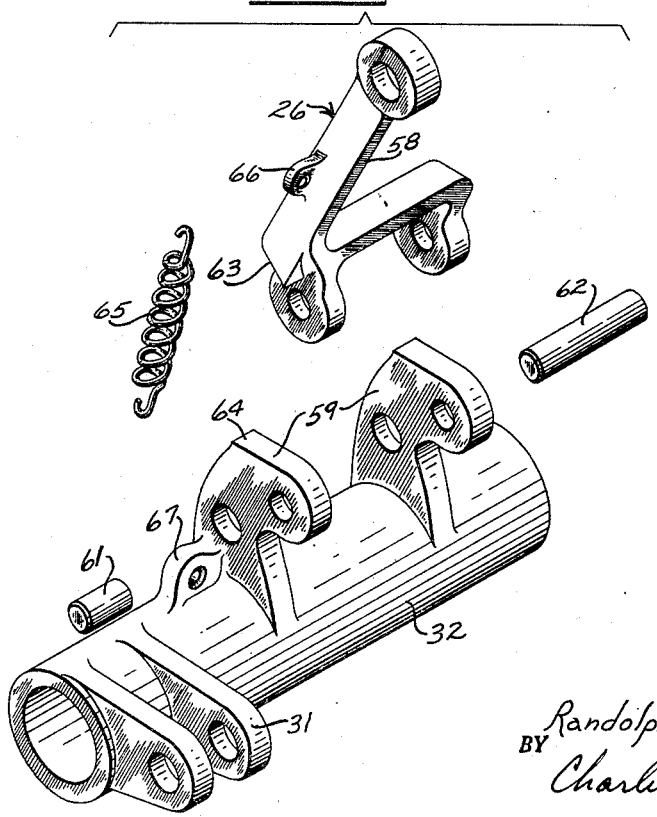
Fig-3-
INVENTOR.
Randolph C. Barnes
BY Charles M. Fryer
ATTORNEY.

Patented July 14, 1953

2,645,474

UNITED STATES PATENT OFFICE 2,645,474

SAFETY CONTROL FOR ENGINE GOVERNORS

Randolph C. Barnes, Peoria, Ill., assignor to Caterpillar Tractor Co., San Leandro, Calif., a corporation of California Application October 13, 1947, Serial No. 779,565

3 Claims. (Cl. 264—3)

This invention relates to safety controls for engine governors.

It is common practice in operating internal combustion engines to provide some means for interrupting engine operation to effect shut-down automatically upon the occurrence of some unsafe or unusual condition such as failure of lubricating oil pressure, excessive rise in temperature, or over-speeding. One manner of accomplishing such safety shut-down of a compression ignition engine is to provide a spring normally tending to urge the fuel pump rack-bar toward off position and to prevent the spring from operating so long as the engine is functioning properly. However, the engine governor also controls the position of the fuel pump rack-bar and would normally prevent the safety shut-down spring from operating. This condition has been overcome by including a resilient connection between the governor and the rack-bar. During normal engine operation this resilient connection is ineffective but it collapses or serves to permit the safety shut-down mechanism to move the rack-bar toward no fuel position. A difficulty arising from this arrangement is that two springs, i. e., the safety shut-down spring and the spring in the resilient connection between the governor and the rack-bar, are opposing each other. Furthermore, the safety shut-down spring is expanding and spending its potential energy against the action of the other spring which is being compressed or loaded and becomes progressively stiffer in its action. The consequence is a sluggish operation of the safety shut-down mechanism and in some instances failure to effect shut-down of the engine when it is required.

It is an object of this invention to overcome these disadvantages by providing an improved safety control for an engine governor, particularly by improvement of the resilient connection between the governor and the fuel pump rack-bar. This and other objects and advantages of the invention and the manner in which they are accomplished are made apparent in the following specification by reference to the accompanying drawings.

In the drawings:

Fig. 1 is a view in side elevation of a fuel pump housing for an internal combustion engine with the essential portions of the pump mechanism shown schematically and with a governor and a safety shut-down mechanism illustrated in section;

Fig. 2 is a view looking into the governor housing taken on the line II—II of Fig. 1;

Fig. 3 is a separated view of a jointed lever and associated mechanism forming a part of the governor and including the resilient connection between the governor and the fuel pump rack-bar;

Fig. 4 is a detail showing the jointed lever and resilient connection with the lever in its normal operating position; and Fig. 5 is a view like Fig. 4 illustrating the lever in the position it assumes when the resilient connection gives way to the action of the safety shut-down mechanism.

The invention will be described by reference to a more or less conventional fuel control and governor mechanism employed with a safety control of conventional design responsive to lubricating oil pressure though it will be understood the invention is equally adaptable to use with similar safety devices responsive to engine temperature or speed.

In Fig. 1 of the drawings a fuel pump housing of an internal combustion engine is illustrated at 10 as including and supporting a plurality of fuel pumps 11, there being one pump for each of the engine cylinders. The pumps are of the type wherein rotation of the plunger effects metering of fuel to the engine cylinders and each pump is illustrated as having a plunger 12 with a gear 13 secured thereto and meshing with a rack-bar 14 so that upon sliding movement of the rack-bar, several pump plungers would be simultaneously angularly adjusted in accordance with conventional practice. Each of the pump plungers is reciprocated during engine operation in the usual manner by a pump plunger camshaft 15 having a plurality of cams, one of which is shown at 16 thereon operable through a follower 17 to raise the pump plunger against the returning action of a spring 18, the rack-bar 14 is positioned during engine operation by a governor driven from the camshaft 15 as by gears 19 and 20. The shaft 21 which supports the gear 20 also supports a pair of governor flyweights 22 which pivot on pins 23 and carry rollers 24. As the flyweights 22 spread outwardly or swing about the pivots 23 in response to engine speed, the rollers 24 engage a collar 25 slidable on the shaft 21 and engage a lever generally indicated at 26 which rocks about a shaft 27. The upper end of the lever 26 is connected as by a link 28 with the rack-bar 14. Swinging movement of the lever 26 towards engine shut-down position or clockwise as viewed in Fig. 1 is opposed by a main governor spring 30 (see Fig. 2) that is anchored between ears 31 formed on an elongated hub 32 of the lever 26 at one end. The other end of the main governor spring 30 is anchored through a conventional connection to ears 34 on a sleeve 35 fixed against rotation on a shaft 36 as by a set screw 37. A lever 38 (Fig. 2) is secured to the shaft 36 exteriorly of the governor housing and may be connected through suitable linkage with a manually actuated governor control lever (not shown) to provide a means for varying the tension of the main governor spring 30.

A conventional safety shut-down mechanism responsive to failure in engine lubricating oil pressure is illustrated in Fig. 1 as comprising a lever 40 pivotally supported as at 41. The normal position of this lever is that shown in broken lines where it will not interfere with the governor controlled sliding movement of the rack-bar 14. The lever is, however, connected as through a link 43 with a spring 44 tending to urge it to the full line position shown wherein its end contacts the end of the rack-bar 14 and forces it to the right in which position the fuel pump plungers will be rotated to their no fuel or engine shut-down position. When the engine is started the lever 40 is manually held in the broken line position shown and the spring 44 is retained in compressed position by lubricating oil pressure. To accomplish this, lubricating oil under pressure is introduced through a pipe 45 into a chamber 46 containing a bellows 47 surrounding and enclosing the spring 44. The lubricating oil under pressure is introduced through passages 48 and 49. Lubricating oil from the same source under the same pressure enters a bellows 50 contained in a chamber 51 through a passage 52 and during normal engine operation the pressure of lubricating oil within the bellows 50 expands the bellows and closes a valve 53 in the bottom of the chamber 51 against the pressure of an expansible spring 54 which tends normally to open the valve.

Assuming that the engine is in operation and that lubricating oil pressure fails, the reduction of pressure in the bellows 50 will permit springs 54 to open the valve 53. Consequently, oil under pressure in the chamber 46 will bleed from such chamber through passage 49 and through chamber 51 escaping through the open valve and passing through a pipe 56 by means of which it is returned to a low pressure reservoir such as, for example, the crankcase of the engine. This exhausting of pressure from the chamber 46 permits expansion of the spring 44 to swing the lever 40 from the broken line to the full line position illustrated in Fig. 1 and consequently to effect engine shut down.

Conventional mechanisms are also employed for relieving oil pressure in the chamber 46 in the event of excessive engine temperature or overspeeding but the construction of these mechanisms is not essential to an understanding of the present invention.

It is apparent from the foregoing description that an automatic shut-down of the engine in response to unusual operating conditions effects a movement of the rack-bar 14 in opposition to the position in which it is held by governor operation. To make possible this movement of the rack-bar without opposing the governor spring the present invention provides a resilient connection in association with the lever 26, the details of construction of which are best illustrated in Figs. 3, 4 and 5. In these figures the lever 26 is shown as comprising an upper portion 58 and a lower portion 59. The lower portion 59, as is best shown in Fig. 3, is formed of two parts spaced from each other on the hub portion 32. This construction is employed in order that the lever may conveniently support a pair of spaced anti-friction rollers 60 for engagement by the governor collar 25 and also so that the lower portion of the lever may straddle the governor shaft 21. The upper portion 58 of the lever is pivoted as by pins 61 and 62 to the lower portion and has a shoulder 63 engageable with an edge 64 of one of the lower members 59. To limit its swinging movement about the pivot pin 61, a spring 65 is anchored between an ear 66 on the upper portion of the lever and an ear 67 on the lower portion thereof and acts as illustrated in Fig. 4 normally to hold the lever in its relatively straight position or against pivotal movement about the pin 61. When the safety shut-off mechanism operates as hereinabove described to move the rack-bar toward the right, the resiliency of the spring 65 permits the lever to swing or break about the pivotal connection 61 of its two parts, thus, making possible the movement of the rack-bar to its shut-down position without disturbing the position of the governor.

It is apparent that in the event of unusual operating conditions which effect shut-down of the engine the spring 44 (Fig. 1) of the safety control mechanism extends or expands and becomes progressively weaker in its action of moving the rack-bar. On the other hand, the spring 65 in the jointed lever 26 is being expanded against its tension and becoming progressively stronger and more difficult to flex. It is this opposition of spring action that has created an undesirable condition in connection with safety control mechanisms and the present invention overcomes resulting disadvantages through the specific arrangement of the spring 65 with relation to the jointed lever 26.

Referring to Figs. 4 and 5 the position of the spring 65 is shown to be such that its moment arm tending to hold or return the upper part of the lever 58 to the normal or unbroken position of Fig. 4 is reduced as the lever part 58 moves to the right as shown in Fig. 5. In other words, the center line of the spring normally positioned considerably to one side of the pivot point 61 as shown in Fig. 4 is swung towards such pivot point so that a progressively diminishing force is required to swing the upper lever part 58 to the right and as this corresponds to the progressively diminishing power afforded by the expanding spring 44 of the safety control mechanism the difficulties arising from opposing spring action are overcome.

I claim:

1. In an engine fuel feed mechanism which includes a governor, linkage between the governor and said mechanism, and a safety shut down device including a normally loaded spring releasable to urge the fuel feed to shut down position in the event of unusual operating conditions, a resilient connection in the linkage to enable the shut down device to actuate the fuel feed mechanism toward shut down position regardless of the governor position, said resilient connection comprising a lever in said linkage with a pivotal connection intermediate its ends, a spring connected between the pivoted parts of the lever to one side of the pivotal connection, stop means on the lever to limit the action of the spring when the lever assumes a substantially straight position, a connection between the spring in the safety shut down device and the said linkage to urge the lever toward a cocked position when the shut down spring is released whereby the spring on the lever will approach an over-center position with relation to the pivotal connection and will oppose the action of the shut down device with a progressively diminishing force.

2. In an engine fuel feed mechanism which includes a governor, linkage between the governor and said mechanism, and a safety shut down device including a normally loaded spring releasable to urge the fuel feed to shut down position in the event of unusual operating conditions, a resilient connection in the linkage to enable the shut down device to actuate the fuel feed mechanism toward shut down position regardless of the governor position, said resilient connection comprising a lever in said linkage with a pivotal connection intermediate its ends, a spring connected between the pivoted parts of the lever to one side of the pivotal connection, means normally maintaining the lever in a substantially straight position, a connection between the spring in the safety shut down device and the said linkage to urge the lever toward a cocked position when the shut down spring is released whereby the spring on the lever will approach an over-center position with relation to the pivotal connection and will oppose the action of the shut down device with progressively diminishing force.

3. In an engine fuel feed mechanism which includes a governor, linkage between the governor and said mechanism, and a safety shut down device including a normally loaded spring releasable to urge the fuel feed to shut down position in the event of unusual operating conditions, a resilient connection in the linkage comprising a lever having a pivoted joint intermediate its ends, and resilient means spanning and spaced from the pivoted joint, normally holding the lever in an unbroken relationship and offering resisting moment to breaking at said joint under influence of the normally loaded spring in the shut down device, which resisting moment decreases under continued influence of the normally loaded spring as the resilient means approaches over-center position with relation to the pivotal joint of the lever.

RANDOLPH C. BARNES.

References Cited in the file of this patent

UNITED STATES PATENTS

| Number | Name | Date |
|---|---|---|
| 1,055,834 | Tibbetts | Mar. 11, 1913 |
| 1,996,679 | Lepek | Apr. 2, 1935 |
| 2,096,291 | Tanner | Oct. 19, 1937 |
| 2,225,234 | Schettler | Dec. 17, 1940 |
| 2,290,797 | Benjamin | July 21, 1942 |
| 2,566,083 | Endsley et al. | Aug. 28, 1951 |